US009848283B2

(12) United States Patent
Lovitt et al.

(10) Patent No.: US 9,848,283 B2
(45) Date of Patent: *Dec. 19, 2017

(54) COUPLING DEVICES USING MULTIPLE DISCOVERY ZONES

(71) Applicant: MICROSOFT TECHNOLOGY LICENSING, LLC, Redmond, WA (US)

(72) Inventors: Andrew W. Lovitt, Redmond, WA (US); Jason R. Farmer, Snohomish, WA (US); Ted E. Dinklocker, Sammamish, WA (US); Craig S. Brenner, Sammamish, WA (US); Darko Kirovski, Chicago, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 166 days.

This patent is subject to a terminal disclaimer.

(21) Appl. No.: 14/789,072

(22) Filed: Jul. 1, 2015

(65) Prior Publication Data

US 2015/0327049 A1 Nov. 12, 2015

Related U.S. Application Data

(63) Continuation of application No. 13/715,777, filed on Dec. 14, 2012, now Pat. No. 9,107,028.

(51) Int. Cl.
*H04W 8/00* (2009.01)
*H04W 12/06* (2009.01)
(Continued)

(52) U.S. Cl.
CPC ........... *H04W 4/008* (2013.01); *H04L 63/061* (2013.01); *H04W 8/005* (2013.01); *H04W 12/04* (2013.01); *H04W 12/06* (2013.01)

(58) Field of Classification Search
CPC ... H04W 8/005; H04W 40/24; H04W 40/248; H04W 48/08; H04W 48/16; H04W 12/06;
(Continued)

(56) References Cited

U.S. PATENT DOCUMENTS 7,174,130 B2  2/2007 Kurisko et al.
7,436,300 B2  10/2008 Glass et al.
(Continued)

FOREIGN PATENT DOCUMENTS

WO 2005109781 A1 11/2005
WO 2012070036 A1 5/2012

OTHER PUBLICATIONS

"Non Final Office Action Issued in U.S. Appl. No. 13/715,777", dated Oct. 17, 2014, 9 Pages.
(Continued)

*Primary Examiner* — Andrew Wendell
(74) *Attorney, Agent, or Firm* — Workman Nydegger (57) ABSTRACT

A system in which a discovering wireless device formulates a first discovery zone. In response to discovering a discoverable wireless device within the zone, the discovering wireless device establish a wireless communication channel with the discoverable wireless device using a powered wireless protocol, and communicates security data with the discoverable wireless device using the wireless communication channel. The discovering wireless device also formulates a second discovery zone that is larger than the first discovery zone, and uses the security data to pair with a target device within the second discovery zone. Thus, pairing is significantly simplified from a user perspective.

20 Claims, 4 Drawing Sheets

(51) Int. Cl.
*H04W 40/24* (2009.01)
*H04W 4/00* (2009.01)
*H04L 29/06* (2006.01)
*H04W 12/04* (2009.01)

(58) Field of Classification Search
CPC ............ H04W 12/08; H04W 36/0022; H04W 36/0038
See application file for complete search history.

(56) References Cited

U.S. PATENT DOCUMENTS

| | | | |
|---|---|---|---|
| 7,738,569 | B2 | 6/2010 | Quinn et al. |
| 8,213,908 | B2 | 7/2012 | Manzanedo et al. |
| 9,107,028 | B2* | 8/2015 | Lovitt ............ H04W 8/005 |
| 2004/0266347 | A1 | 12/2004 | Palin et al. |
| 2007/0099653 | A1 | 5/2007 | Parron et al. |
| 2007/0178882 | A1 | 8/2007 | Teunissen et al. |
| 2008/0065908 | A1 | 3/2008 | Appaji |
| 2009/0012705 | A1 | 1/2009 | Sundararajan et al. |
| 2009/0067846 | A1 | 3/2009 | Yu et al. |
| 2009/0286479 | A1 | 11/2009 | Thoresson et al. |
| 2009/0323608 | A1* | 12/2009 | Adachi ............ H04W 48/18 370/329 |
| 2010/0015919 | A1* | 1/2010 | Tian ............ H04W 8/005 455/41.2 |
| 2010/0178984 | A1 | 7/2010 | Lum et al. |
| 2011/0256891 | A1 | 10/2011 | Soliman et al. |
| 2011/0319123 | A1* | 12/2011 | Kwun ............ H04W 52/16 455/522 |
| 2013/0229944 | A1 | 9/2013 | Montemurro et al. |
| 2013/0286889 | A1 | 10/2013 | Cherian et al. |
| 2014/0134947 | A1 | 5/2014 | Stouder-Studenmund |
| 2014/0135016 | A1 | 5/2014 | Gholmieh et al. |
| 2014/0153444 | A1 | 6/2014 | Zhou et al. |
| 2014/0307872 | A1 | 10/2014 | Heo et al. |

OTHER PUBLICATIONS

"Notice of Allowance Issued in U.S. Appl. No. 13/715,777", dated Apr. 14, 2015, 5 Pages.

"Notice of Allowance Issued in U.S. Appl. No. 13/715,777", dated Feb. 17, 2015, 8 Pages.

Kainda, et al., "Usability and Security of Out-Of-Band Channels in Secure Device Pairing Protocols", In Proceedings of the Fifth Symposium on Usable Privacy and Security, Jul. 15, 2009, 12 Pages.

Kuo, et al., "Low-Cost Manufacturing, Usability, and Security: An Analysis of Bluetooth Simple Pairing and Wi-Fi Protected Setup", In Proceedings of the 11th International Conference on Financial Cryptography and 1st International Conference on Usable Security, Feb. 16, 2007, 15 Pages.

Saxena, et al., "Universal Device Pairing Using an Auxiliary Device", In Proceedings of the Fourth Symposium on Usable Privacy and Security, Jul. 23, 2008, 12 Pages.

"International Preliminary Report on Patentability Issued in PCT Application No. PCT/US2013/075214", dated Mar. 5, 2015, 8 Pages.

"International Search Report and Written Opinion Issued in PCT Application No. PCT/US2013/075214", dated Jun. 30, 2014, 11 Pages.

"Second Written Opinion Issued for PCT Patent Application No. PCT/US2013/075214", dated Nov. 3, 2014.

"NFC Forum: Bluetooth Secure Simple Pairing Using NFC," Published Oct. 18, 2011, 32 pages, Available at http://members.nfc-forum.org/resources/AppDocs/NFCForum AD BTSSP 1 0.pdf.

* cited by examiner

COUPLING DEVICES USING MULTIPLE DISCOVERY ZONES

CROSS-REFERENCE TO RELATED APPLICATIONS

This application is a continuation of U.S. patent application Ser. No. 13/715,777 filed on Dec. 14, 2012, entitled "COUPLING DEVICES USING MULTIPLE DISCOVERY ZONES," which issued as U.S. Pat. No. 9,107,028 on Aug. 11, 2015, and which application is expressly incorporated herein by reference in its entirety.

BACKGROUND

Devices may conventionally wirelessly communicate using a number of wireless protocols. Some protocols require that only one of the two communicating devices source energy for the transmission. Such is the basis of near field communication in which one device is passed into close proximity with another device. The device that sources its own power creates an electromagnetic field that, through inductive coupling, provides power to the device that does not source its own power. Such temporarily transferred power is enough to transfer small amounts of data temporarily, but is not suitable for complex interactions between the two devices.

On the other hand, devices that are individually powered might communicate using protocols that require that both devices be powered. Such protocols may be referred to herein as "powered wireless protocols". This allows for much more complex interactions between the devices. Some powered wireless protocols allow pairing between the two devices, such that each device obtains security information that allows the two devices to communicate with each other. For instance, BLUETOOTH® and WI-FI DIRECT™ are powered wireless protocols that enable device pairing.

Pairing of two devices can involve some user interaction. Sometimes, such user interaction requires knowledge that many users do not have. For instance, some device pairing protocols require the user to get each of the two devices to take on complementary pairing roles. For instance, one device is to be set to become discoverable, and the other device is to be set to perform discovery. For a typical user, it can be difficult to navigate the user interface offered by the devices to set the devices in their proper complementary roles. Other user interaction is also required such as, for example, entering of a code in one device, and then reentering the same code on the second device, in order to allow the pairing to be secure.

BRIEF SUMMARY

At least one embodiment described herein relates to a system in which a discovering wireless device formulates a first discovery zone. In response to discovering a discoverable wireless device within the zone, the discovering wireless device establish a wireless communication channel with the discoverable wireless device using a powered wireless protocol, and communicates security data with the discoverable wireless device using the wireless communication channel. The discovering wireless device also formulates a second discovery zone that is larger than the first discovery zone, and uses the security data to pair with a target device within the second discovery zone. In some cases, the target device could be the discoverable wireless device.

The first discovery zone may be relatively small and thus security may be implicit based on the ability to place both devices into close proximity to each other. In that context, security data may be securely exchanged since non-secure devices cannot easily enter the physical area of the first discovery zone. Thus, the first discovery zone is used to exchange security data from which a subsequent pairing may be established. This may be done without significant, or perhaps any, input from a user, other than perhaps placing one of the discovering device and discoverable device in close proximity to the other so as to be within the first discovery zone. Thus, pairing is significantly simplified from a user perspective.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a system in which a discovering wireless device formulates a first discovery zone. In response to discovering a discoverable wireless device within the zone, the discovering wireless device establish a wireless communication channel with the discoverable wireless device using a powered wireless protocol, and communicates security data with the discoverable wireless device using the wireless communication channel. The discovering wireless device also formulates a second discovery zone that is larger than the first discovery zone, and uses the security data to pair with a target device within the second discovery zone. Thus, pairing is significantly simplified from a user perspective. Some introductory discussion of a computing system will be described with respect to FIG. 1. Then, the principles of discovery and pairing of devices will be described with respect to FIGS. 2A, 2B and 3.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
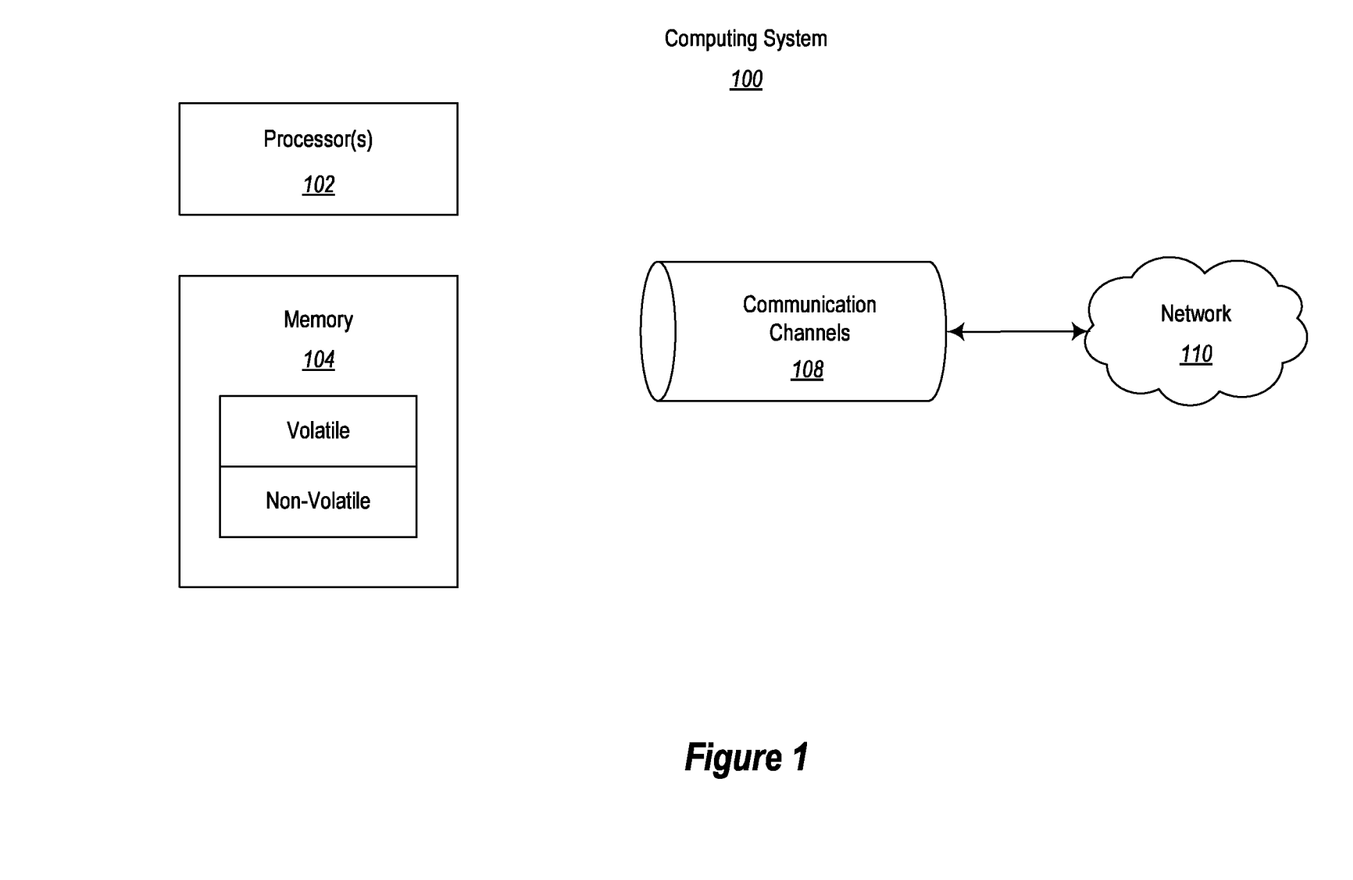
FIG. 1 abstractly illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2A:
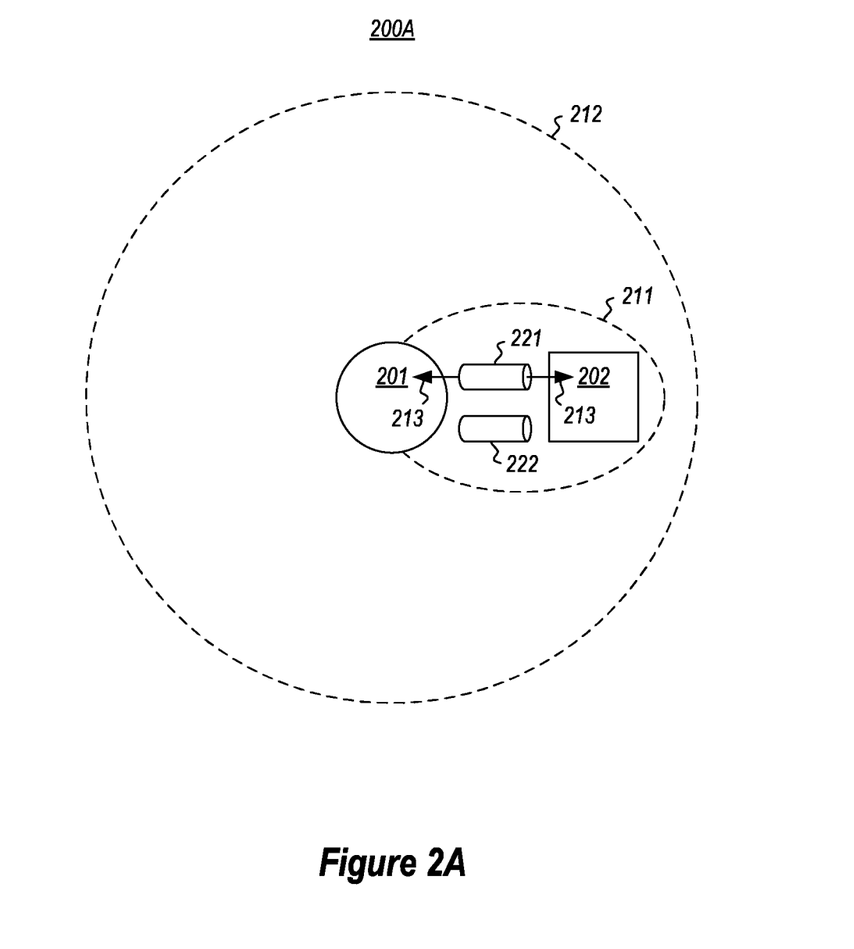
FIG. 2A illustrates a system that includes a discovering wireless device that emits two discovery zones; namely, a smaller zone which is used to establish a connection with a discoverable device and exchange security data, and a larger zone in which the security data is used to establish a secure connection with the discoverable wireless device.

FIG. 2A illustrates a system 200A in which the principles described herein may be employed. The system 200A includes a discovering wireless device 201 and a discoverable wireless device 202. In FIG. 2A (and in FIG. 2B described further below), the discovering wireless device 201 is abstractly represented by a circle, whereas the discoverable wireless device 202 is abstractly represented by a square, simply to distinguish one from the other in an abstract sense.

Figure 2B:
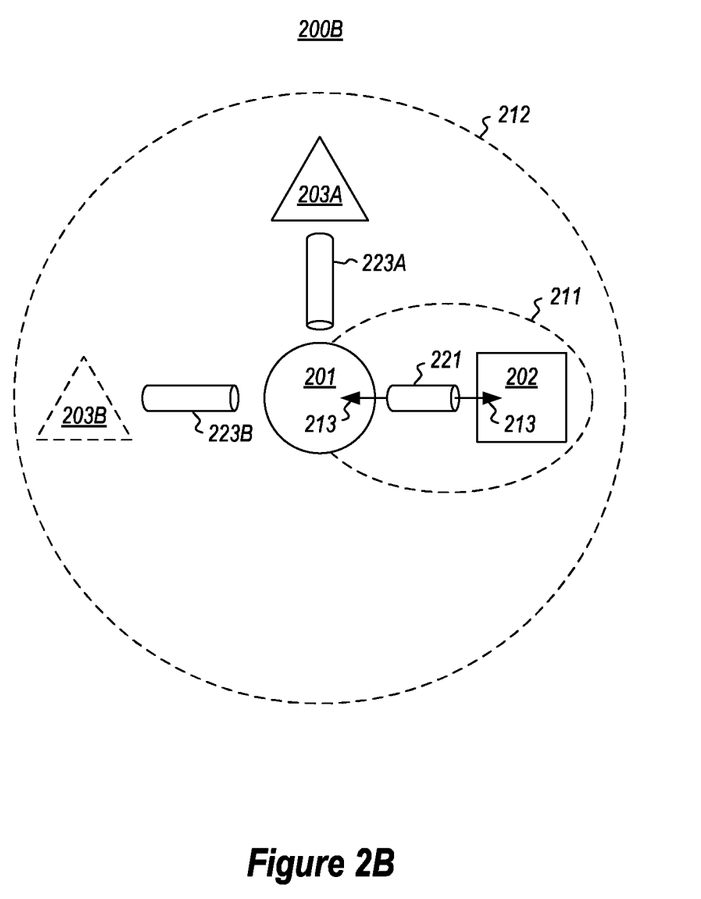
FIG. 2B illustrates a system that is similar to FIG. 2A, except that the security data is used to establish a secure connection with two target devices that are not party to the exchange of security data caused by the first connection in the smaller zone.

Although not required, each of the discovering wireless device 201 and the discoverable wireless device 202 of FIGS. 2A and 2B (as well as the target wireless devices 203 of FIG. 2B) may have processing and memory capability and thus may be structured as described above for the computing system 100 of FIG. 1. Alternatively or in addition, the wireless devices 201, 202 and 203 may process using hardware and/or firmware. The wireless devices 201, 202 and 203 may likewise have a user interface through which a user may interact with the respective wireless devices. However, the principles described herein reduce the amount of interaction the user is to make with the user interface in order to establish pairing between the wireless devices.

Referring to FIGS. 2A and 2B, the discovering wireless device 201 generates two discovery zones; a smaller discovery zone 211 and a larger discovery zone 212. Although two dimensions of the discovery zones 211 and 212 are illustrated in FIGS. 2A and 2B, the discovery zone will be three dimensional and have a particular volume.

In the illustrated embodiments, the smaller discovery zone 211 is directional (e.g., to the right in FIGS. 2A and 2B), although this is not required. The larger discovery zone 212 is larger in volume than the smaller discovery zone 211 by orders of magnitude, perhaps, one, two, three, four, or even more orders of magnitude. The larger discovery zone 212 is illustrated as being approximately circular in FIG. 2A, although the exact extent of the discovery zone may vary over time, and may be affected by objects, particularly conductive objects, within the larger discovery zone 212. The shape of a discovery zone at any particular point in time also depend on the antenna shape, the wireless device transceiver power, the background noise levels in the relevant frequency spectrum, and other dynamically changing conditions. Accordingly, there may be some dynamic change in the shape of the discovery zones 211 and 212. For instance, the larger discovery zone 212 may be formed using multiple access points, and need not be physically associated with one device or a set of devices. Furthermore, while the larger discovery zone 212 may be formed from the same device as the smaller discovery zone 211, that is also not required as they may also be created by distinct devices.

In an automotive environment, the smaller discovery zone 211 may be a matter of inches or a few feet near the dashboard, whereas the larger discover zone 212 may encompass substantially all of the inside of the vehicle and perhaps even a little further. In that case, the discovering device 201 may be the vehicle or built-in portion of the vehicle near the dashboard, whereas the discoverable device 202 might be, for example, a smart phone.

In a larger environment, perhaps the smaller discovery zone 211 is within a small secure room, and the larger discovery zone 212 is the size of a building such as a smart home. In that case, the discovering wireless device 201 could be a device in the master bedroom of the smart home, whereas the discoverable device 202 is a laptop or smart phone. However, these are just example applications. The principles described herein are not limited to the specific application of the broader principles described herein.

Returning to FIG. 2A, the discovering wireless device 201 detects the discoverable wireless device 202 within the smaller discovery zone 211, establishes a communication channel 221 between the two wireless devices, and exchanges security data as represented by the bi-direction arrow 213. The discovering wireless device 201 may also discover the discoverable wireless device 202 within the larger discovery zone 212, and use the security data to establish a secure communication channel 222 between the two wireless devices 201 and 202. In the illustrated case, the smaller discovery zone 211 is contained completely within the larger discovery zone 212. Accordingly, if the smaller discovery zone 211 and the larger discovery zone 212 simultaneously exist, then the discoverable wireless device 202 may be contained within both the smaller discovery zone 211 and the larger discovery zone 212 at the same time. However, the creation of the larger discovery zone 212 may be deferred until after the security data is exchanged using channel 221.

The first communication channel 221 was secure in the sense that there is relatively close proximity between the discovering wireless device 201 and the discoverable wireless device 202. To ensure such security, the principles described herein may be more useful in the case of the smaller discovery zone already being within a relatively secure location. For instance, in the automobile example above, the smart phone would have been inside an automobile, which is presumably locked and unlawful entry protected by the force of law. In the building example, entry to the building and into the particular room in which the discovering device is located might also be restricted to authorized individuals (such as a family in the case of the smart home). The small size of the smaller discovery zone 211 further enhances this security.

The second communication channel 222 is secure in the sense that the communications are secured using security data. As an example, such security data might apply security at the application level (such as using an SSL certificate), or below the application level (as is the case for an encryption key).

The communication channels 221 and 222 are each supported by a powered wireless communication protocol that supports pairing. Examples of such wireless protocols include BLUETOOTH® and WI-FI DIRECT™, although the principles described herein are not limited to these conventional pairing protocols, nor to any existing pairing protocols as new pairing protocols may be developed in the future. The communication channels 221 and 222 may be supported by the same pairing wireless communication protocol, or by different pairing wireless communication protocols. For instance, the communication channel 221 may be a BLUETOOTH® channel, whereas the communication channel 222 may be a WI-FI DIRECT™ channel.

Powered wireless communication protocols allow for complex communication exchanges (as compared to near-field communications which allow for simple communication exchanges). Furthermore, modules that permit powered wireless communication protocols to be employed are widely distributed, whereas near field communication modules have limited market penetration. Nevertheless, the discovering wireless device 201 may also have a near field communication module. In such a case, the near field communication module may be used to exchange part of the security data represented by arrow 213.

FIG. 2B illustrates an environment 200B that is similar to the environment 200A of FIG. 2A. However, in FIG. 2A, the initial communication channel 221 is used to exchange security data 213 between the two wireless devices 201 and 202, so that the pairing channel 222 may be established between the discovering wireless device 201 and the discoverable wireless device 202. Thus, in this case, the target wireless device for pairing is the discoverable wireless device 202. On the other hand, in FIG. 2B, the initial communication channel 221 is used to exchange security data 213 so that pairing channel 223A may be established between the discovering wireless device 201 and the target wireless device 203A over channel 223A.

A combination of FIGS. 2A and 2B is also possible, in which case two pairing channels 222 and 223A are created, one with the discoverable wireless device 202, and one with the first target wireless device 203A. Furthermore, FIG. 2B represents further that there may be multiple target devices 203A and 203B with which respective pairing communication channels 223A and 223B may be established, each using all or a portion of the security data 213.

An example application of FIG. 2B might be, for instance, a gaming environment. For instance, the discovering device 201 might be a gaming console. In this case, a discoverable device 202 might be a smart phone. When the smart phone is brought closer to the gaming console, the gaming console might pair with target wireless device 203A, and potentially also with wireless device 203B. Such target wireless devices 203A and 203B may be, for example, game controllers.

Figure 3:
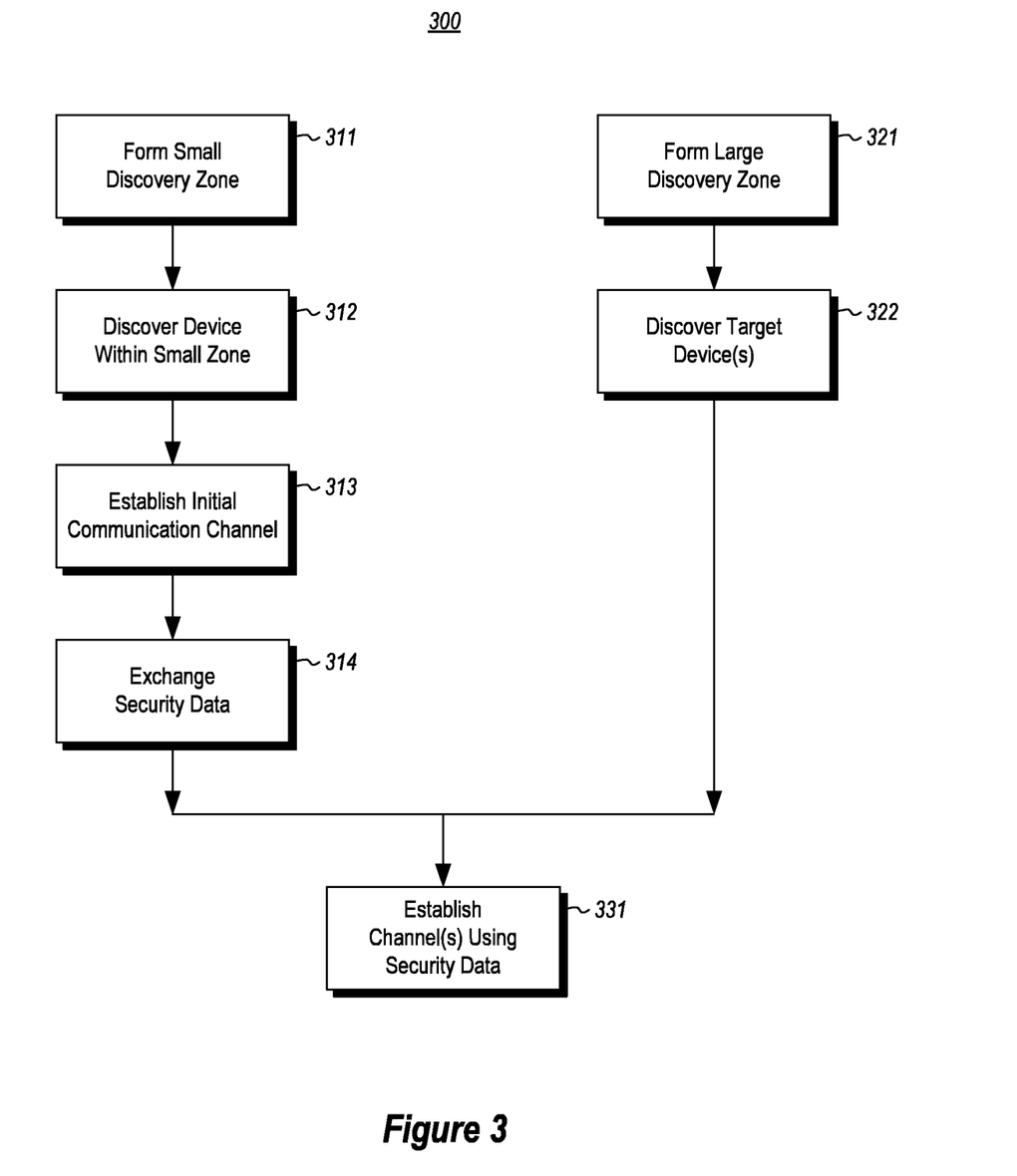
FIG. 3 illustrates a flowchart of a method for pairing a discovering wireless device with a target wireless device.

FIG. 3 illustrates a flowchart of a method 300 for pairing a discovering wireless device with a target wireless device. As the method 300 may be performed in the environment 200A of FIG. 2A or the environment 200B of FIG. 2B, the method 300 will now be described with frequent reference to the FIGS. 2A and 2B.

The discovering wireless device formulates a small discover zone (act 311), and discovers a discoverable wireless device within the first discovery zone (act 312). For instance, in FIGS. 2A and 2B, the discovering wireless device 201 formulates discovery zone 211 and detects discoverable device 202 within the discovery zone 211.

In response, the discovering wireless device 201 establishing a wireless communication channel with the discoverable wireless device using a powered wireless protocol (act 313). For instance, in FIGS. 2A and 2B, the communication channel 221 is established between the discovering wireless device 201 and the discoverable wireless device 202.

The discoverable wireless device and the discovering wireless device communicate security data over this communication channel (act 214). For instance, in FIGS. 2A and 2B, the security data 213 is exchanged over channel 221. This might involve discovering wireless device 201 communicating security data to the discoverable wireless device 202, the discoverable wireless device 202 communicating security data to the discovering wireless device 201, or both. In this way, the security data necessary to pair the discovering wireless device 201 with one or more target wireless devices is provided onto the discovering wireless device 201.

The discovering wireless device also formulates a larger discovery zone (act 321). For instance, referring to FIGS. 2A and 2B, the discovering wireless device 201 formulates larger discovery zone 212. This act 321 is shown in parallel with acts 311 through 314, in that the large discovery zone may exist from even before the small discovery zone 311, or perhaps as late as after the security data is exchanged (act 314), or any time inbetween. This temporal independence is represented by the parallel positioning of act 321 with acts 311 through 314.

After formulating the larger discovery zone (act 321), one or more target wireless devices are discovered (act 322). For instance, in FIG. 2A, the discoverable wireless device 202 is also the target wireless device. In FIG. 2B, the target wireless device is represented by target wireless device 203A. In the case of there being multiple target wireless devices, the target wireless device may also be represented by the target wireless device 203A.

Once the security data is exchanged (act 314), and the target wireless device(s) are discovered in the larger discovery zone (act 322), the discovering wireless device using the security data to pair with a target device discovered within the larger discovery zone (act 331). For instance, in FIG. 2A, the discovering wireless device 201 establishes pairing channel 222 with the discoverable wireless device 202. In FIG. 2B, the discovering wireless device 201 establishes pairing channel 223A with the target wireless device 203A. In the case of multiple target wireless devices, the discovering wireless device 201 establishes pairing channel 223B with the target wireless device 203B.

Again, FIGS. 2A and 2B could be combined such that are three target wireless devices with which the discovering wireless device establishes pairing channels. For instance, such target wireless devices might include all of wireless devices 202, 203A and 203B.

In one specific example, the discovering device includes two chips, one for each type of communication channel 221 and 222. However, a single chip that switches between low and high power may also suffice. In the two chip example, the small-range chip may perhaps always be in inquiry mode. When an inquireable (i.e., discoverable) phone comes into range, the device attempts a "just works" pairing and if accepted by the user, the devices exchange link-keys. The small-range chip then shares the link-key with the large-range chip, which happens to have the exact same MAC address as the small-range chip, and thus can use the link-key to establish the second communication channel.

In a second example, the small-range chip is again always in inquiry mode. When an inquireable phone comes into range, the "just works" pairing is rejected and a "Numeric Compare" or Legacy PIN pairing is established. In this case, a graphical user interface automatically interrupts the user on the inquiry device and assists them with the completion of the pairing. The small-range chip then shares the link-key with the large-range chip, which happens to have the exact same MAC address as the small-range chip.

Accordingly, the principles described herein allow a secure mechanism for establishing a secure pairing between wireless devices, while releasing the user from having to perform complex processes in order to facilitate the pairing.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A discovering wireless device comprising:
   one or more processor; and
   one or more storage device having stored computer-executable instructions which are executable by the one or more processor for causing the discovering wireless device to perform the following:
   formulate a first discovery zone so as to discover a first target wireless device within the first discovery zone;
   detect the first target wireless device within the first discovery zone;
   in response to detecting the first target wireless device, establish a wireless communication channel with the first target wireless device using a wireless protocol;
   communicate security data with the first target wireless device using the established wireless communication channel;
   formulate a second discovery zone that has different size dimensions than the first discovery zone; and pair with the first target device within the second discovery zone using the same security data communicated in the first discovery zone.

2. The discovering wireless device in accordance with claim 1, wherein the wireless protocol is a powered wireless protocol.

3. The discovering wireless device in accordance with claim 1, wherein the discovering device is configured to be an internal portion of an automobile.

4. The discovering wireless device in accordance with claim 3, wherein the first target device includes a smart phone.

5. The discovering wireless device in accordance with claim 1, wherein the discovering wireless device is configured to be part of a game console and wherein the first target device is a game controller.

6. The discovering wireless device in accordance with claim 1, wherein the first discovery zone and the second discovery zone are formulated by different wireless chips in the discovering wireless device.

7. The discovering wireless device in accordance with claim 1, wherein the first discovery zone is a directional discovery zone.

8. The discovering wireless device in accordance with claim 1, wherein size dimensions of the second discovery zone define a larger volume than a smaller volume defined by size dimensions of the first discovery zone.

9. The discovering wireless device in accordance with claim 1, wherein the first and second discovery zones exist simultaneously.

10. The discovering wireless device in accordance with claim 1, wherein the first discovery zone is contained entirely within the second discovery zone.

11. The discovering wireless device in accordance with claim 1, wherein the discovering wireless device comprises a wireless router.

12. The discovering wireless device in accordance with claim 1, wherein the security data comprises application level security data.

13. The discovering wireless device in accordance with claim 12, wherein the security data operates on layers below an application level.

14. The discovering wireless device in accordance with claim 1, wherein the discovering wireless device is configured to use the security data to pair with a second target device, the second target device being detected within the second discovery zone.

15. The discovering wireless device in accordance with claim 1, wherein the first target device comprises a mobile phone.

16. The discovering wireless device in accordance with claim 1, wherein the first discovery zone comprises a directional discovery zone formed by a directional antenna.

17. A discovering wireless device comprising:
one or more processor;
a first wireless communication chip configured for communicating over a first wireless communication channel that covers a first zone;
a second wireless communication chip configured for communicating over a second wireless communication channel that covers a second zone that has different dimensions than the first zone; and
one or more storage device having stored computer-executable instructions which are executable by the one or more processor for causing the discovering wireless device to perform the following:
operate the first wireless communication chip in an inquiry mode, the first wireless communication chip being configured to discover target devices in the first zone;
obtain a security key from a target device in association with an attempted pairing by the first wireless communication chip with the target device over the first wireless communication channel;
share the security key from the first wireless communication chip with the second wireless communication chip; and
cause the second wireless communication chip to establish the second wireless communication channel with the target device, the second wireless communication channel being established with the security key, and the second wireless chip being configured to communicate with the target device in the second zone.

18. The discovering wireless device of claim 17, wherein the first wireless communication channel is of a different type of wireless communication channel than the second wireless communication channel.

19. The discovering wireless device of claim 17, wherein the first wireless communication chip has a same MAC address as the second wireless communication chip.

20. A discovering wireless device comprising:
one or more processor;
a wireless communication chip configured for switching between a first power and a second power; and
one or more storage device having stored computer-executable instructions which are executable by the one or more processor for causing the discovering wireless device to perform the following:
operate at the first power over a first wireless communication channel;
obtain a security key from a target device over the first communication channel while operating at the first power;
switch to the second power; and
utilize the security key to establish a second wireless communication channel with the target device and to communicate with the target device at the second power over the second wireless communication channel.

* * * * *